Figure 1:
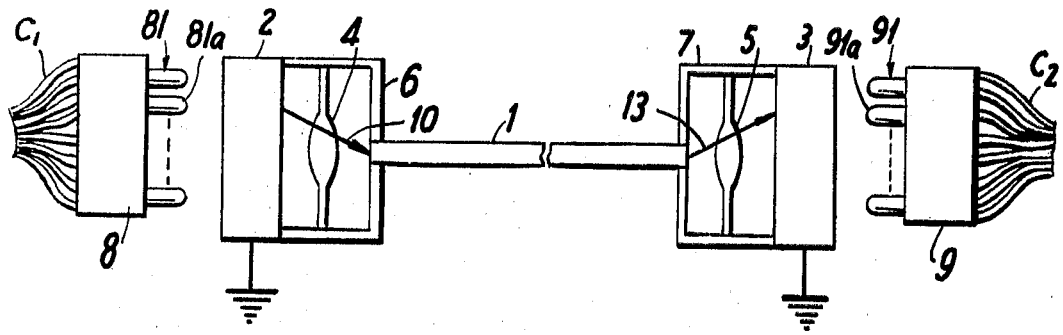

United States Patent
Uchida

[15] 3,663,822
[45] May 16, 1972

[54] MULTI-TERMINAL OPTICAL CABLE UTILIZING A FLEXIBLE GRADED OPTICAL FIBER

[72] Inventor: Teiju Uchida, Tokyo, Japan
[73] Assignee: Nippon Selfoc Company Limited, Tokyo, Japan
[22] Filed: Dec. 23, 1970
[21] Appl. No.: 101,039

[30] Foreign Application Priority Data
Dec. 29, 1969   Japan..................................44/105248

[52] U.S. Cl..........................250/217 S, 250/220 M, 250/227, 350/96 R
[51] Int. Cl.............................G02b 5/14, H01j 39/12
[58] Field of Search.........................250/217 S, 220 M, 22 T; 350/96 R

[56] References Cited
UNITED STATES PATENTS

| 1,072,152 | 9/1913 | Ocampo | 250/220 M |
| 3,434,774 | 3/1969 | Miller | 350/96 R |
| 3,471,214 | 10/1969 | Polanyi | 350/96 R |

*Primary Examiner*—James W. Lawrence
*Assistant Examiner*—T. N. Grigsby
*Attorney*—Sandoe, Hopgood and Calimafde

[57] ABSTRACT

A multi-terminal optical cable includes an optical focusing fiber having a refractive index distribution in which the index varies in substantial inverse proportion to the square of the radial distance form the central longitudinal axis of the fiber to its outer periphery. A plurality of input electrical signals are converted into corresponding light signals at one end of the fiber. Those light signals are imaged by the fiber in a one-to-one relationship on an array of light-sensing elements at the other end of the fiber at which the light images are reconverted to electrical signals, corresponding to the input electrical signals.

9 Claims, 3 Drawing Figures

Patented May 16, 1972

3,663,822

INVENTOR.
TEIJI UCHIDA
BY
Sandoe, Hopgood & Calimafde
ATTORNEYS

3,663,822

MULTI-TERMINAL OPTICAL CABLE UTILIZING A FLEXIBLE GRADED OPTICAL FIBER

The present invention relates generally to cables, and more particularly to an optical cable for making wiring connections between various parts of an electrical or electronic apparatus by means of light.

Heretofore, in various electrical apparatuses, the conductors required for making electrical connections between the respective parts of the apparatus by forming preselected electrical current paths, has always been achieved by the use of cables or wires consisting of metallic conductors such as copper. When conductors of this type are employed in a large scale electric apparatus, such as an information processing apparatus including, for example, an electronic computer, a telephone exchange, or the like, the number of conductors becomes very large and the volume required for housing these conductors creates serious problems, particularly when, as is common, it is desired to achieve compactness of the complete apparatus. Many approaches have been taken in an attempt to reduce the amount of cabling and conductors, particularly in apparatus such as those mentioned above, but it remains a desire to yet further reduce the number of and the size required for the cables and conductors.

It is an object of the present invention to provide an optical cable making use of light, which enables the making of electrical connections by the use of a significantly reduced number of cables, whereby wiring in an electrical or electronic is simplified and the proportion of the volume occupied by the cables in the apparatus may be substantially reduced.

It is a more general object of the invention to achieve a substantial reduction of the use of cables in an electrical apparatus.

It is a further general object to make use of an optical fiber cable for the purpose of making electrical connection between two terminals.

To this end, the invention provides an optical cable comprising an optical fiber having a refractive index distribution in which the refractive index within the cable varies substantially in proportion to the square of the distance from its center axis towards its periphery. An optical fiber having this refractive property is disclosed in a co-pending application, Ser. No. 806,368, entitled Fibrous Converging Light Guide Element, and assigned to the assignee of the present invention.

An optical flux projected into the optical medium as described in said co-pending application having a refractive index distribution represented by $$n = n_0(1 - \tfrac{1}{2}ax^2) \quad (1)$$

(where $n$ is the refractive index at any arbitrary point within the optical fiber, $n_0$ is the refractive index along the center axis of the fiber, $x$ is the radial distance of that point measured from the center axis, and $a$ is a positive constant), is subjected to a converging effect similar to the case of an optical lens.

As describing in an article by S. E. Miller in The Bell System Technical Journal, of November 1965, the focal length $f$ in the medium having the refractive index distribution given by Equation (1), is represented by $$f = \frac{1}{n_0\sqrt{a}\sin\sqrt{az}} \quad (2)$$

Accordingly, if an optical fiber having a refractive index distribution represented by Equation (1) as proposed in said co-pending application is employed as a light propagating medium, and if a light beam is projected onto this optical fiber, the optical fiber would then have an effect equivalent to an optical lens having a focal length $f$ as represented by Equation (2). This optical fiber is hereinafter referred to as a focusing optical fiber.

When a plurality of spatially arrayed bright dots are placed in front of the incident end or face of focusing optical fiber and, if necessary, appropriate optical systems are interposed just before and just behind the focusing optical fiber, real images of the plurality of bright dots are focused at the output end or face of the focusing optical fiber. In the event that a group of luminescent diodes is employed as an arrayed group of bright dots, and photo-electric transducer elements such as, for example, photo-diodes are arrayed at the image forming points corresponding to the individual bright dots, then in response to the lightening and darkening of the respective luminescent diodes, electric signals are obtained at the outputs of the corresponding photo-diodes. Accordingly, the electric input signals to the respective luminescent diodes and the electric output signals from the corresponding photo-diodes are in a one-to-one corresponding relation. As a result of this feature, a single focusing optical fiber can perform a conducting operation that is equivalent to a plurality of individual electric signal cables. Furthermore, this focusing optical fiber is flexible and can propagate the incident light to the emitting end even if it is bent.

The present invention provides a wiring cable making use of light by utilizing the aforementioned nature of the focusing optical fiber. A predetermined number of bright spots or luminescent elements are fixedly applied to one end of the optical fiber and are arrayed on a plane that is substantially parallel to the surface of that one end of the fiber. A plurality of first electric connecting elements are connected to the luminescent elements respectively, and a corresponding plurality of photoelectric transducer elements are fixedly secured to the other end of the self-focusing optical fiber and disposed on a plane that is substantially parallel to the surface of the other end at the positions at which the image of the luminescent elements are focused. A plurality of second electric connecting elements are connected to the respective ones of the photoelectric elements, as a result of which, the luminescent elements are caused to radiate by electric currents supplied through the first electric connecting elements. The luminescent images of the luminescent elements are thus propagated by the focusing optical fiber, and after the images have been converted into electric currents by the photo-electric transducer elements at the other end of the fiber, the electric currents are externally derived by the second electric connecting elements.

According to the present invention, since the electric currents flowing through a plurality of electric wiring cables are propagated as light beams through a single focusing optical fiber to other electric parts or apparatuses where they are reconverted into electric signals to be supplied to the desired electric parts or apparatuses, the electric connections between the parts or apparatuses can be reliably achieved. Moreover, the wiring can be completed by means of the single focusing optical fiber, and consequently, the writing in an electric apparatus can be completed with a minimum number of elements occupying a greatly reduced volume. In addition, upon the use of the optical cable according to the present invention, it is only necessary to provide a connector at the ends of the necessary number of electric wiring leads and to fit this connector to the connecting element of the cable so that its handling is also very simple.

Figure 2A:
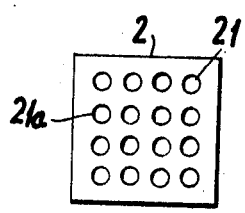
Figure 2B:
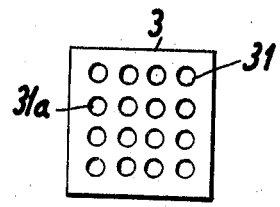

To the accomplishment of the above and to such further objects as may hereinafter appear, the present invention relates to a multi-terminal optical cable substantially as defined in the appended claims and as described in the following specification taken together with the accompanying drawing in which:

FIG. 1 is a schematic view showing the construction of an optical cable according to a preferred embodiment of the present invention; and FIGS. 2a and 2b are plan views showing the construction of parts of the optical cable illustrated in FIG. 1.

The multi-terminal optical cable of the invention, as shown in FIG. 1, comprises a focusing optical fiber operating as an optical cable and having a radial refractive index distribution defined by Equation (1) above, that is, its index of refraction decreases substantially in proportion to the square of the radial distance from the central longitudinal axis. An incident input connector 2 is coupled to one end of fiber 1, and an emitting or emitting connector 3 is coupled to the other end of the optical fiber. Condenser lenses 4 and 5 are interposed respectively between connectors 2 and 3 and the inlet and outlet ends of the fiber. The incident side of connector 2 and lens 4 are fixedly secured to one end of the focusing optical fiber 1 by means of an arm 6 and similarly, the emitting side of connector 3 and lens 5 are fixedly secured to the other end of focusing optical fiber 1 by means of an arm 7.

A predetermined number of luminescent diodes 21, such as GaP, GaAs or the like are disposed in the incident side of connector 2, at predetermined positions on an insulator plate as shown in FIG. 2a, one of the electrodes of each of the luminescent diodes being commonly grounded. On the other surface of the insulator plate in the incident side of connector 2 are provided female contactors (not shown) equal in number to the luminescent diodes 21. Each of the female contactors and the other electrode of each of the luminescent diodes are respectively electrically connected with each other. The incident side of connector 2 is fixedly secured to one end of focusing optical fiber 1 by arm 6 in a manner such that the surface on which the luminescent diodes 21 are disposed is opposed to lens 4.

In the emitting side of connector 3, a predetermined number of photo-electric transducer elements 31 (for instance, a silicon photo-diode, CdS, or the like) are disposed at predetermined positions on an insulator plate and are equal in number to the number of luminescent diodes 21. One of the electrodes of each of photo-electric transducer elements 31 are commonly grounded. On the other surface of the insulator plate in the emitting side of connector 3 are provided female contactors (not shown) equal in number to photo-electric transducer elements 31, the female contactor and the other electrode of the photo-electric element being respectively electrically connected with each other. The emitting side of connector 3 is fixedly secured to the other end of the self-focusing optical fiber 1 by means of arm 7 in a manner such that the surface on which the photo-electric transducer elements 31 are disposed is opposed to the lens 5.

Returning to FIG. 1, there is shown a plug 8 connected to a cable $C_1$, coming for example, from one apparatus (not shown). Plug 8 includes a plurality of male contactors 81, connection of plug 8 and connector 2 being made by fitting male contactors 81 to the female contactors in the incident side of connector 2. A plug 9 is connected to a cable $C_2$ coming from an apparatus (also not shown) to be electrically connected to said one apparatus. Plug 9 includes a plurality of male contactors 91, and connection between plug 9 and connector 3 is made by fitting male contactors 91 to the female contactors in the emitting side of connector 3.

In this way, one apparatus and another apparatus can be electrically connected via the multi-terminal optical cable according to the present invention. The manner in which this is accomplished is believed to be apparent.

Assuming that an electric current flows from the apparatus connected to plug 8 via cable $C_1$ to the apparatus connected to plug 9 via cable $C_2$, the electric current supplied to, for example, a male contactor 81a flows through the corresponding female contactor in the incident side of connector 2 to a luminescent diode 21a connected thereto, resulting in the radiation of that luminescent diode. The light radiated from luminescent diode 21a is focused to a real image on a photo-electric transducer element 31a located on the emitting side of connector 3 by a system including lens 4, focusing optical fiber 1 having the same nature as an optical lens, and lens 5 placed in the rear of the emitting end of focusing optical fiber 1. At the photoelectric transducer element 31a that image is converted into a corresponding electric current.

The converted electric current is transmitted through the female contactor connected to photo-electric transducer element 31a, via male contactor 91a fitted to that female contactor, and through the cable $C_2$ to the apparatus connected thereto.

The operation on other electric current paths between other contactors 81 and the associated ones of the contactors 91 occur in the same manner. Therefore, the apparatus connected to the cable $C_1$ and the apparatus connected to the cable $C_2$ are electrically connected via a single multi-terminal optical cable.

In this connection, it is necessary to array the photo-electric transducer elements 31 so that the lights radiated by the separate luminescent diodes 21 may be projected in a one-to-one relationship by means of the focusing optical fiber onto the respective photo-electric transducer elements 31. In order to retain such a relationship, the photo-electric transducer elements and the luminescent diodes are preferably fixedly secured to focusing optical fiber 1 by means of arms 6 and 7, respectively.

According to the embodiment of the invention herein specifically described, a large number of electric current paths can be replaced by a single optical cable, so that the wiring in a large scale apparatus such as, for example, a data processing apparatus, may be greatly simplified, and the volume occupied by the wiring may be greatly reduced.

Although lenses 4 and 5 are used in the embodiment described these are not always necessary. In addition, the luminescent diodes and the photo-electric transducer elements may be provided arbitrarily in any desired number, and thus the invention is not to be limited to the case of the illustrated embodiment in which 16 of each of these elements are provided.

Furthermore, as the bright spots or luminescent elements, in addition to primary light sources such as a luminescent diode or a lamp, secondary light sources such as a combination of a screen and an electrically controlled optical shutter, can be employed. For instance, if a screen is provided at the position corresponding to the group of bright spots, and if a plurality of images of the bright spots are focused on the screen through the shutter, then each of these images functions as a secondary light source. In this case, the control input end of each shutter and the electric output end of the corresponding photo-electric transducer element constitute a pair of input and output ends.

Still further, although the embodiment is herein illustrated with respect to the case in which female contactors are respectively provided in the respective connectors 2 and 3 on the incident and emitting sides of the fiber, it is a matter of course that the female contactors may be replaced by male contactors and plugs 8 and 9 may be replaced by receptacles.

Also, while only the case of transmitting electric currents from one side to the other side is illustrated in the above-mentioned embodiment, if a desired number of pairs among the pairs of luminescent diodes and photo-electric transducer elements are reversed with respect to their incident and emitting sides, a cable which can optically transmit electric currents in both directions, may be obtained.

Thus, while only a single embodiment of the invention has been herein specifically described, it will be apparent that variations may be made therein without necessarily departing from the spirit and scope of the invention.

I claim:

1. A multi-terminal optical cable comprising a flexible focusing optical fiber having a refractive index distribution where the refractive index within said fiber decreases substantially in proportion to the square of the distance from the center axis of the fiber towards its periphery, a plurality of luminescent elements located at one end of said optical fiber and arrayed on a plane that is relatively fixed with respect to the surface of said one end, a corresponding plurality of first electric connecting elements respectively connected to said luminescent elements, a plurality of photo-electric transducer elements at the other end of said optical fiber and disposed on a plane that is relatively fixed with respect to the surface of said other end at positions at which the images of said luminescent elements are focused, and second electric connecting elements connected to respective ones of said photo-electric elements, whereby electric currents supplied from said first electric connecting elements are transmitted through said single optical fiber to said second electric connecting elements.

2. The optical cable of claim 1, further comprising first focusing means disposed intermediate said luminescent elements and said one end of said fiber, and second focusing means disposed intermediate said other end of said fiber and said transducer elements.

3. The optical cable of claim 1, further comprising means for supporting said luminescent elements on said first-mentioned plane, and means for fixedly securing said supporting means to said one end of said fiber.

4. The optical cable of claim 3, further comprising second means for supporting said luminescent elements at said second-mentioned plane, and second means for fixedly securing said second supporting means to said other end of said fiber.

5. A multi-terminal optical cable comprising a flexible focusing optical fiber having a refractive index distribution where the refractive index within said fiber decreases substantially in proportion to the square of the distance from the center axis of the fiber towards its periphery, means located in optical communication with one end of said fiber for converting a plurality of input electrical signals to a corresponding plurality of light signals, means including said optical fiber for forming images of said light signals on a plane in optical communication with the other end of said fiber, and means located at said plane for converting said light signal images to a plurality of output electrical signals corresponding respectively to said input electrical signals.

6. The cable of claim 5, in which said input signal converting means comprises an array of luminescent means respectively receiving said plurality of input electrical signals, and means for supporting said array in a relatively fixed relation with respect to said one end of said fiber.

7. The cable of claim 6, in which said output signal converting means comprises a corresponding area of photo-electric transducer means, and means for securing said transducer element array in a relatively fixed relation with said other end of said optical fiber.

8. The cable of claim 7, further comprising first and second focusing means respectively interposed between said luminescent means array and said one end of said fiber, and between said transducer means array and said other end of said fiber.

9. The cable of claim 7, further comprising an input connector including a first plurality of contactors, each of said first plurality of contactors being respectively connected to one of said luminescent means, and an output connector including a second plurality of contactors, each of said second plurality of contactors being in contact respectively with one of said transducer means.

* * * * *